United States Patent [19]

Martinez Llaneza

[11] Patent Number: 4,807,536
[45] Date of Patent: Feb. 28, 1989

[54] MICROPROCESSOR-CONTROLLED SYSTEM OF AERIAL TRANSPORT FOR INDUSTRIAL INSTALLATIONS

[75] Inventor: Manuel Martinez Llaneza, Madrid, Spain

[73] Assignee: Ivestronica, S.A., Madrid, Spain

[21] Appl. No.: 780,724

[22] Filed: Sep. 27, 1985

Related U.S. Application Data

[63] Continuation-in-part of Ser. No. 490,158, Apr. 29, 1983, abandoned.

[30] Foreign Application Priority Data

May 5, 1982 [ES] Spain .................................... 511954

[51] Int. Cl.$^4$ .............................................. B61L 27/04
[52] U.S. Cl. ...................................... 104/88; 104/127; 104/172.4
[58] Field of Search ............... 104/88, 172 S, 127, 104/253, 252, 249, 250, 183

[56] References Cited

U.S. PATENT DOCUMENTS

| | | | |
|---|---|---|---|
| 2,989,928 | 6/1961 | Fletcher et al. | 104/88 |
| 3,200,933 | 8/1965 | Schenk et al. | 104/88 |
| 3,209,896 | 10/1965 | Roberts | 104/88 |
| 3,592,141 | 7/1971 | Davidson | 104/88 |
| 3,751,640 | 8/1973 | Daigle et al. | 104/88 |
| 3,788,491 | 1/1974 | Stone | 104/183 |
| 3,828,682 | 8/1974 | Klein | 104/88 |
| 3,835,786 | 9/1974 | McIllwain | 104/172 S |
| 4,068,597 | 1/1978 | Moyer | 104/88 |
| 4,239,435 | 12/1980 | Weiss et al. | 104/88 |
| 4,265,178 | 5/1981 | Veith | 104/88 |
| 4,406,230 | 9/1983 | Villemaud | 104/88 |
| 4,474,114 | 10/1984 | Davidson | 104/250 |

FOREIGN PATENT DOCUMENTS

0721528 11/1965 Canada .................................. 104/88
1249995 10/1971 United Kingdom .

*Primary Examiner*—Henry A. Bennet
*Attorney, Agent, or Firm*—Wenderoth, Line & Ponack

[57] ABSTRACT

A microprocessor-controlled system of aerial transport for industrial installations. This system is characterized by the combination of the following parts: (a) a main circuit, (b) a group of carts, (c) stations, (d) a group of points, (e) an ascent group, (f) identification readers, (g) control cards and (h) central unit, and, furthermore, the main circuit is composed of a structure of tracks and carrier columns, over which tracks the group of carts may travel; the carts are able to have access to the stations through the action of the points, and the central unit is based on a microcomputer which knows and controls the evolution of the system by directing its operation according to a predetermined programming, changeable at any time, and making decisions according to criteria with which it has been programmed, all of the operations being a function of the information which is supplied to the microcomputer by the control cards and the group of identification readers.

7 Claims, 14 Drawing Sheets

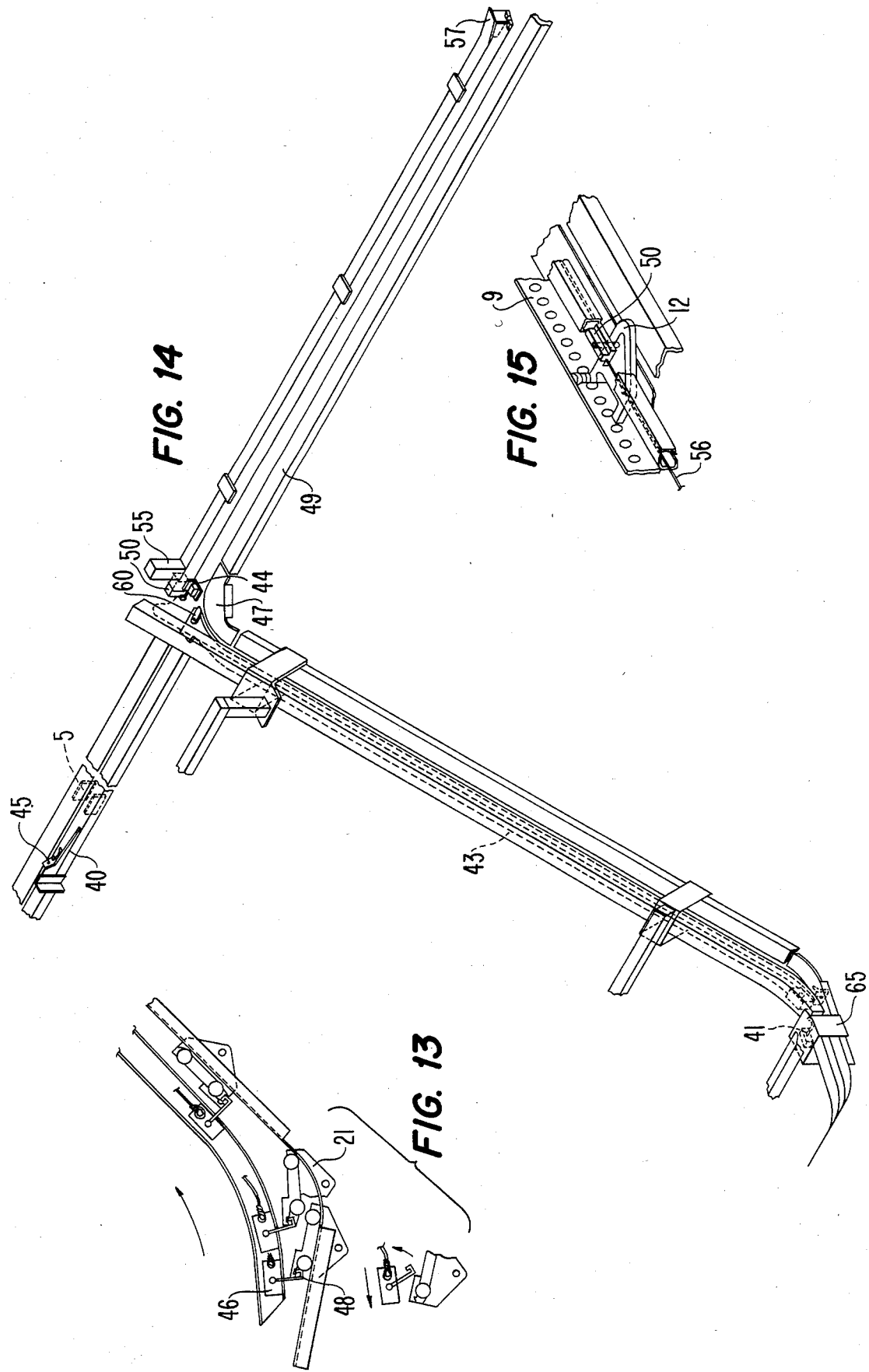

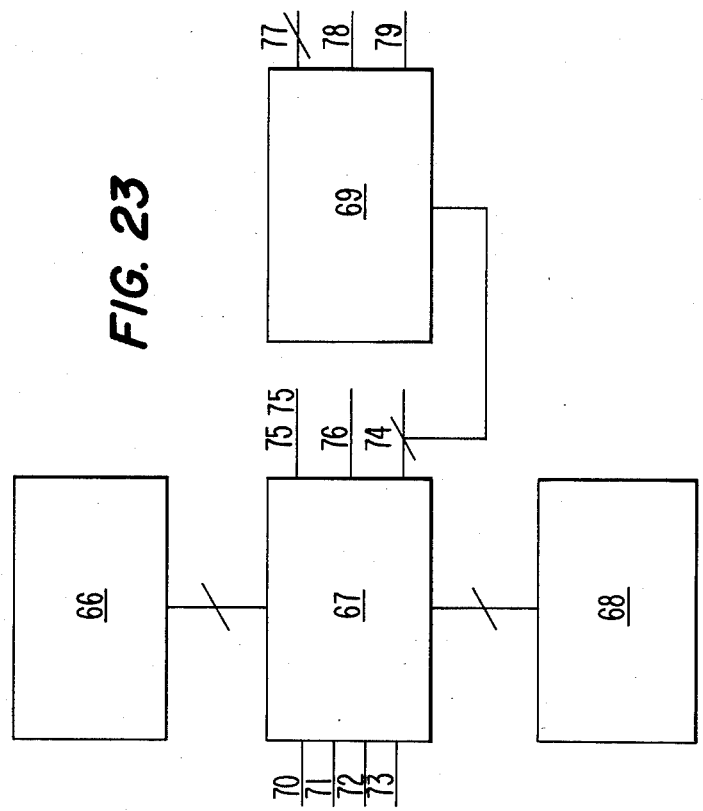
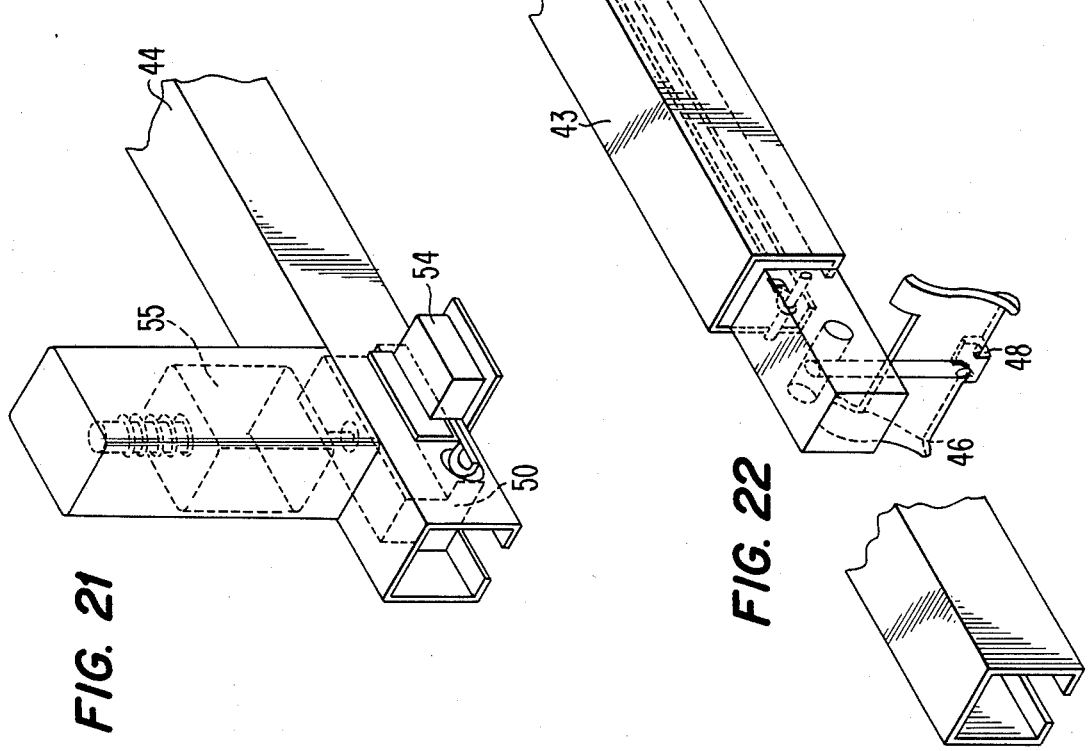

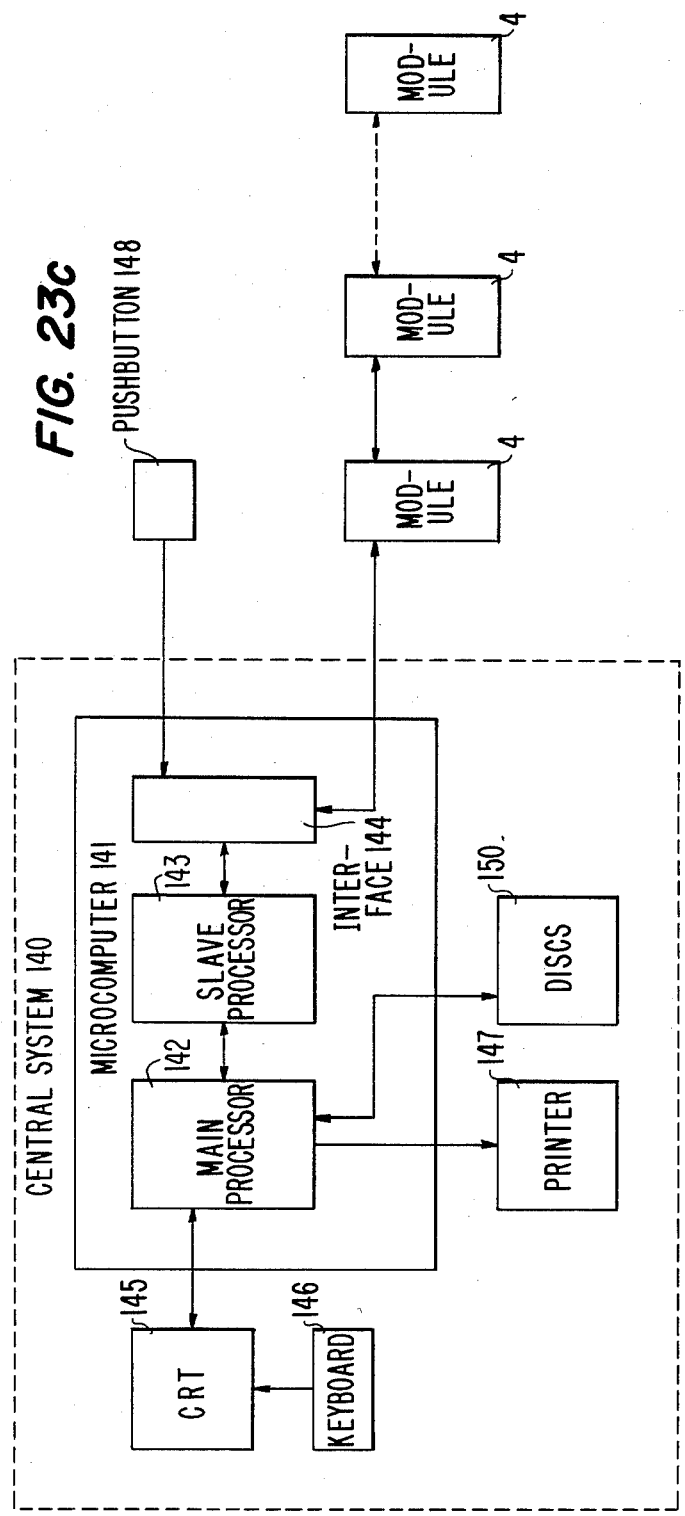

MICROPROCESSOR-CONTROLLED SYSTEM OF AERIAL TRANSPORT FOR INDUSTRIAL INSTALLATIONS

This application is a continuation-in-part of Ser. No. 490,158, filed Apr. 29, 1983 now abandoned.

BACKGROUND AND SUMMARY OF THE INVENTION

The invention relates to an aerial transport system capable of carrying elements such as components to be made up, parts to be mounted or handled, etc. to different work posts of an industrial installation and also of taking them away in accordance with a prearranged or given operational sequence, and of making the appropriate decisions for predetermined events in order to take these events into account, in addition to supplying the information necessary for the control and management of the production of said industrial installation.

The system is constituted based on a transport circuit constructed with some specific tracks over which some small transport elements travel which will be referred to throughout this specification as "carts" and which constitute the support for the element to be transported. There is a series of stations all along this circuit, that are joined to the main circuit and in which the working post is located.

In the case that the invention is applied to the clothing industry, the so-called "carts" will transport, for example, hangers with the garments to be made up, the system having the capacity to recognize and send each garment to its station of destination at which the operator who will carry out his specific job will be located, with a garment travelling through different stations or work posts as it is being made up.

Although other transport systems are known which are applied to industrial installations, the system according to the invention provides two fundamental aspects which give it priority over the prior systems from the point of view of practical utilization:

(1) The mechanical and electronic devices on which the system of the invention is based provide a very simple and highly reliable construction which is, in the outcome, ideal for its control by microprocessor.

(2) The system has an "intelligence" which gives it great flexibility in the balancing of the process; in addition, it can be modified at any time, whenever convenient, given that a system of interactive control has been provided. Furthermore, the system is capable of carrying out the management of the production of the installation and of the personnel.

In general terms, the aerial transport system according to the invention is constituted by the following groups:
 (a) Main circuit
 (b) Carts
 (c) Station
 (d) Track switch
 (e) Lifting system
 (f) Readers
 (g) Control card
 (h) Central system.

All of these groups are explained in the detailed specification given below.

BRIEF DESCRIPTION OF THE DRAWINGS

Below, one way of carrying out the invention is described in detail with reference to drawings in which:

FIG. 13 is a schematic view of the lifting system at the lifting area of the station, showing the way it works;

FIG. 14 is an illustrative view of the lifting system;

FIG. 15 shows how the pushers push the pullers of the lifting system;

FIG. 21 is a perspective view of the rear area of the transport tube;

FIG. 22 is a perspective part view showing the arrangement of the lifter; and

FIG. 23 is a block diagram of the different control cards of the entire system.

FIG. 23b is a block diagram of the logic circuit board in the module chassis of FIG. 23a.

FIG. 23c is a block diagram of the central system.

DESCRIPTION OF THE PREFERRED EMBODIMENT

The groups of rementioned are described in the following.

(a) Main Circuit

Figure 1:
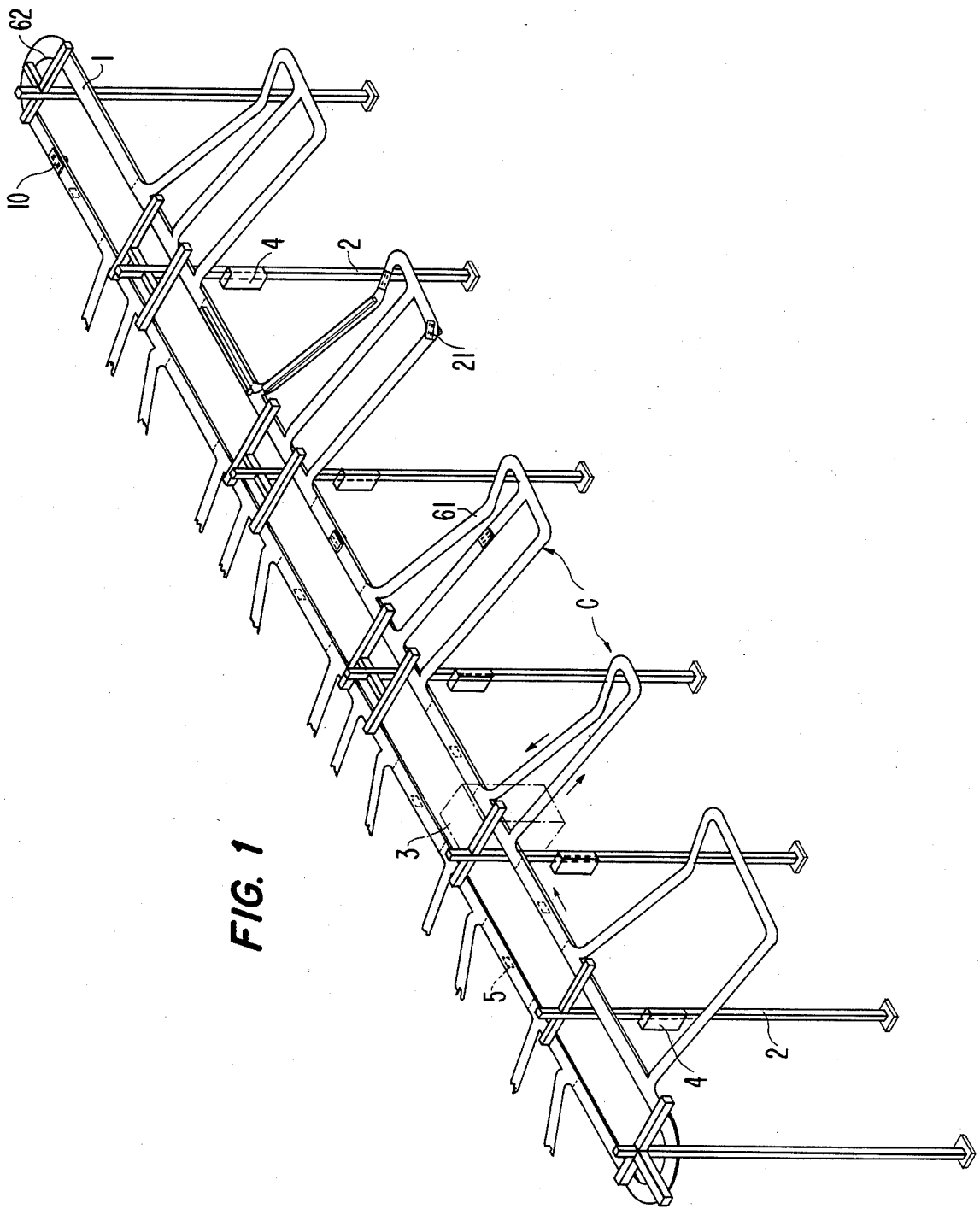
FIG. 1 is a schematic perspective view of the general arrangement of the transport system.

The main circuit (a), which is schematically shown in FIG. 1, is constituted by some self-supporting tracks 1, supported by columns 2 anchored to the floor or hung from the ceiling of the industrial installation. This circuit supports the motor group 3, the electronic cards 4, the information readers 5 and part of the lifting system (e), and the stations.

Two stations (c) (single, double or multiple) are connected one at each side of each column 2, the group constituting a module in such a way that the size of the system is arbitrary and can be modified by the addition or the elimination of some modules thus formed.

Each column 2 has an electronic card 4 which provides the power and control for its respective module. The cards 4 are connected in series to the central control system (h) by means of male and female connectors in such a way that if there is damage to a card, the corresponding module can be put out of operation by disconnecting the connectors which are connected to it and connecting them to each other, so that the rest of the system will not be affected and will continue its operative function.

For each group of modules, which can be variable depending on the type of motor chosen, there is a motor group 3 constituted by a motor, preferably a three-phase motor with a reduction gear box, transmission belts 7 and studded disks 8 which constitute a means for moving the perforated transport band 9. The tracks 1 are located in each module and interconnect the various modules 61, their lengths being appropriate for the type of station (single, multiple, or special) and the dimensions of the work post.

The ends of the main circuit are closed by adjustable semicircular tracks 62. Preferably, the tracks are self-supporting, although they are compatible with a parallel reinforcement structure, if so required by the system use. Their section, being constant, allows for the passing and guidance of the band 9, the rolling of the carts (b) and the passage of their keels 21.

At the same level as each motor group 3, there are slots which allow the disks to reach the band 9 with elements for guiding the same. The tracks 1 may be constituted of double plates, welded structures, extruded structures or composite structures (commercial structures which are resistant and embedded in extruded plastic to provide the appropriate form).

Figure 5:
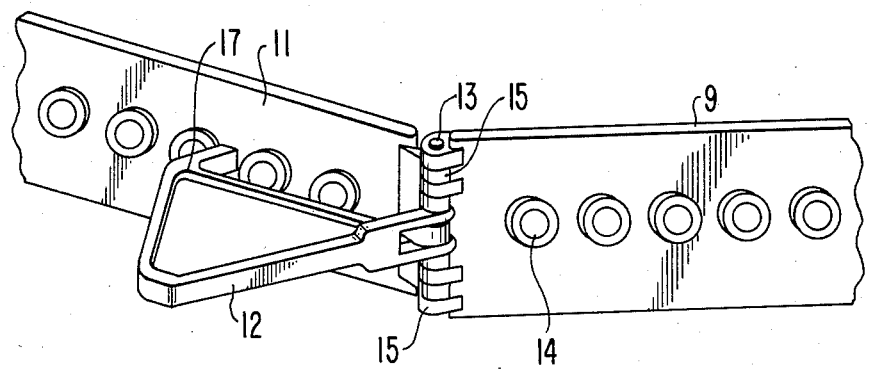
FIG. 5 is a perspective view of a section of the transport band with its pusher.
Figure 6:
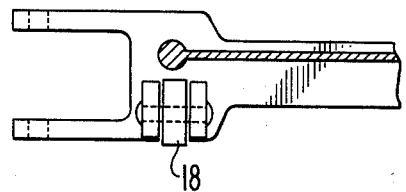
FIG. 6 is a detail view of the pusher of FIG. 5.
Figure 7:
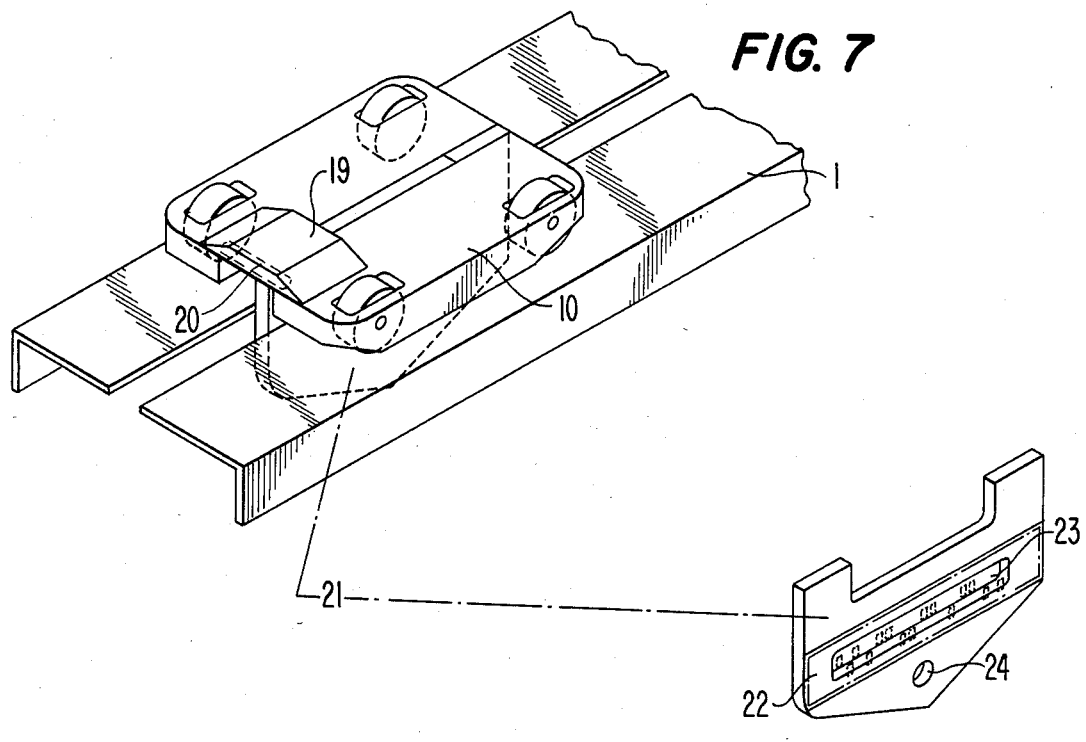
FIG. 7 illustrates the constitution of the "carts" inserted on the tracks of the system, as well as a detail of its keel.

The band 9 with its pushers, has the purposes of carrying the carts (b) 10 and of moving the lifting system. This band 9 can be either continuous or divided, and may be made of any sufficiently resistant material. The preferred solution is that which is constituted by plastic sections 11 (see FIG. 5) and pushers 12 with low friction coefficients and high wear resistance, the sections 11 being connected to each other by bolts 13; all of these parts being formed by injection molding. The sections 11 of the band 9 have reinforced holes 14, in which the disks 8 of the motor group 3 said sections 11 mesh ending in an appropriate form to allow for their connection by means of the bolts 13 which, at the same time, hold small wheels (rollers) 15 in place which reduce the friction during the movement of the band 9. Each two connections of sections 11 support a pusher 12 by means of the same connection bolt 13, this pusher rests by its rear section 17 on this band to allow it to follow the curves of the circuit. This pusher 12 has a roller 18 (see FIG. 6) and a projection in order to connect with the pin of the lifting system puller.

(b) Carts

The cart 10 serves the purpose of supporting and moving the hanger, tray or support which holds the garments or pieces which are being transported within the industrial installation and which are being worked on. Likewise, the cart identifies such parts by bearing a code 23 which can be read by the readers 5.

The body of the cart 10 houses the wheels which rest on the upper surface of the tracks 1, and it has a projection 19 at the rear which allows for its handling by the "One-by-One Dispenser" (O.O.D.) which will be described below, there being an open space and a groove 20 in the body of said projection which allow for its transport by the lifting system.

The keel 21 acts as a guide for travelling along the tracks 1 and it has a slot 22 for the placement of the reading card which bears the code 23, as well as a drill hole 24 from which is hung the load to be transported.

(c) Station

The stations are the parts of the system in which the operators receive and handle the load transported by the carts 10. They may be single, double, or, in general, multiple, depending on the number of entry tracks 25 generically shown at 61. Thus, the reference to an entry track 25 applies to all of the entry tracks which are provided in a station.

Figure 2:
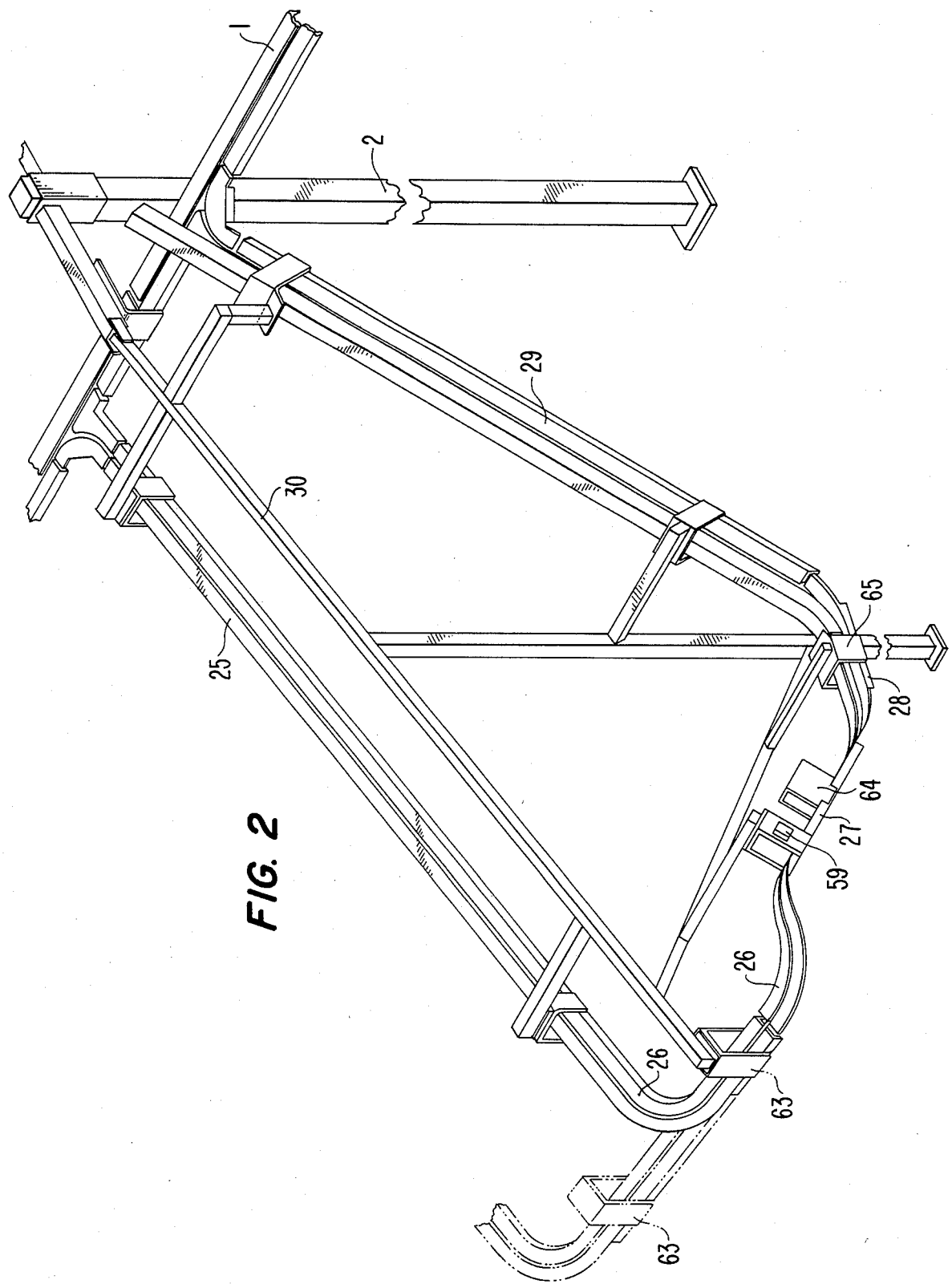
FIG. 2 is a schematic perspective view of the configuration of a station (c)
Figure 3:
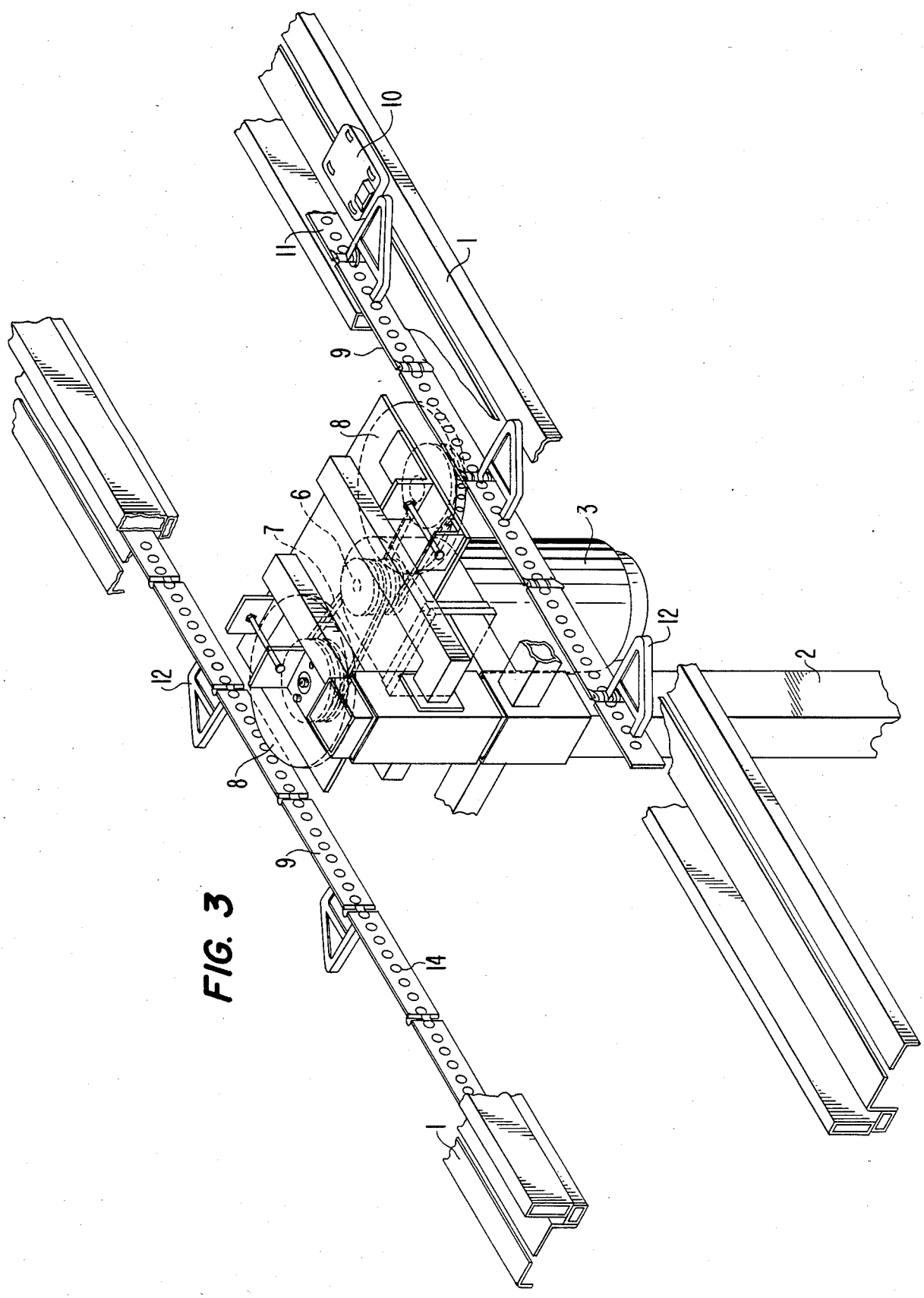
FIG. 3 is a schematic perspective view of the motor group and the transport band.
Figure 4:
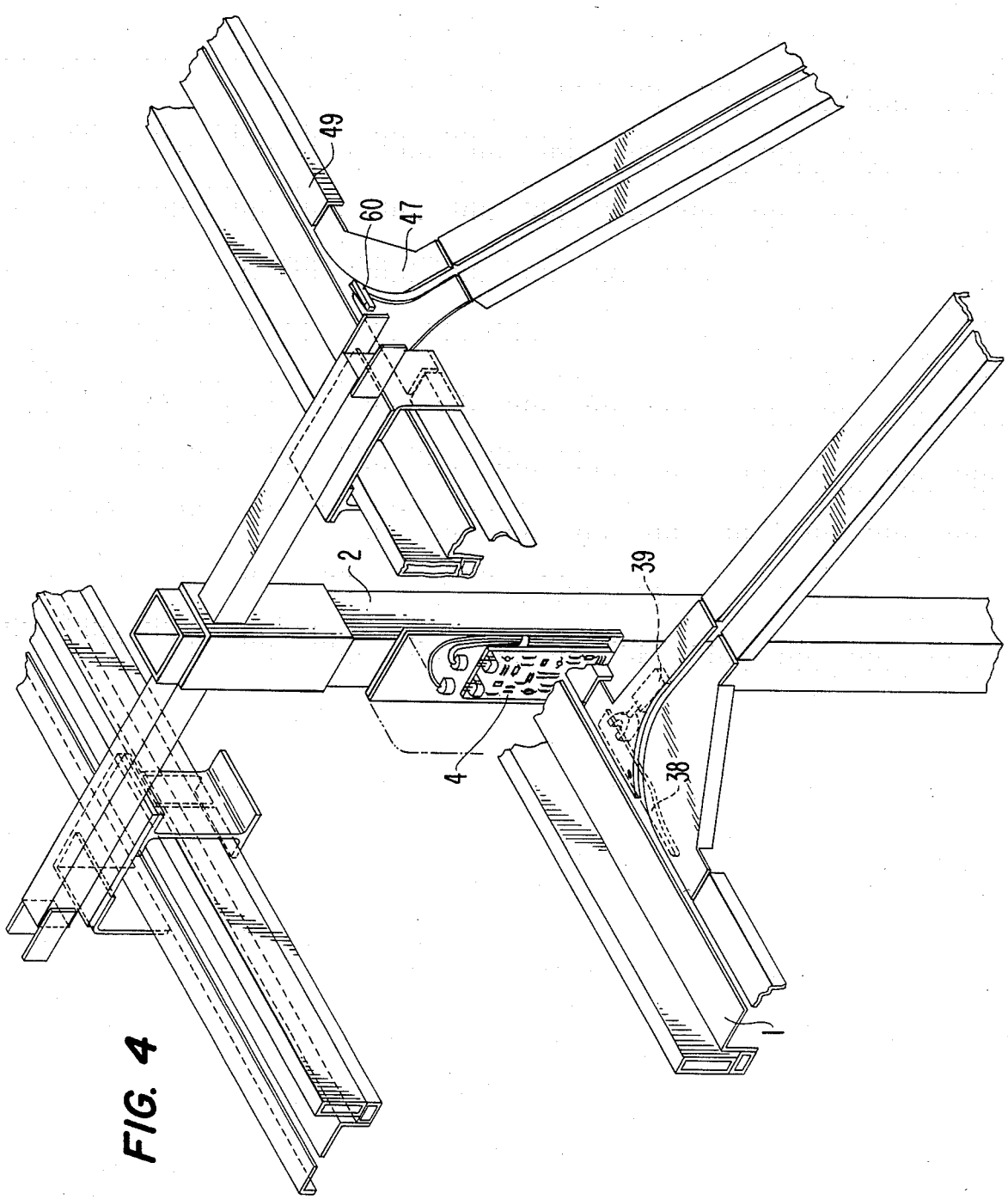
FIG. 4 is a schematic view of the connection from one station to the main circuit, showing also the location of the module control card.

The stations are constituted by a support structure 30 (see FIG. 2) which holds the entry track 25 in place, on which the carts 10 which arrive at the station are parked, the change of direction curves 26, the work area 27, in downgrade, the waiting area 28 and the ascent track 29 as shown in FIG. 2.

In order to regulate the supply of carts 10 to the work area, some devices called One-by-One Dispenser (O.O.D.) 63 have been developed.

Figure 8:
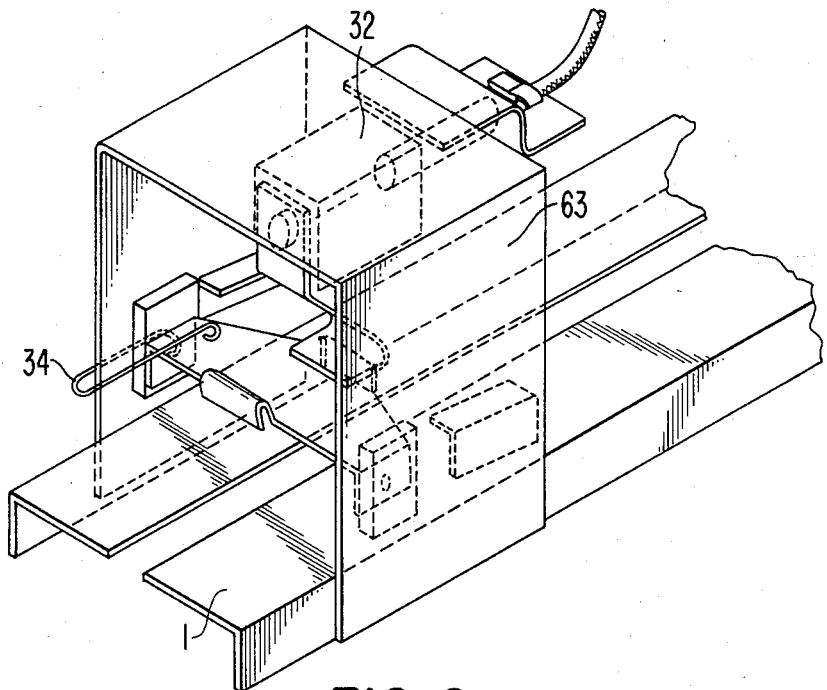
FIG. 8 is a schematic perspective view showing the constitution of the device called a "One-by-One Dispenser" (O.O.D.)
Figure 9:
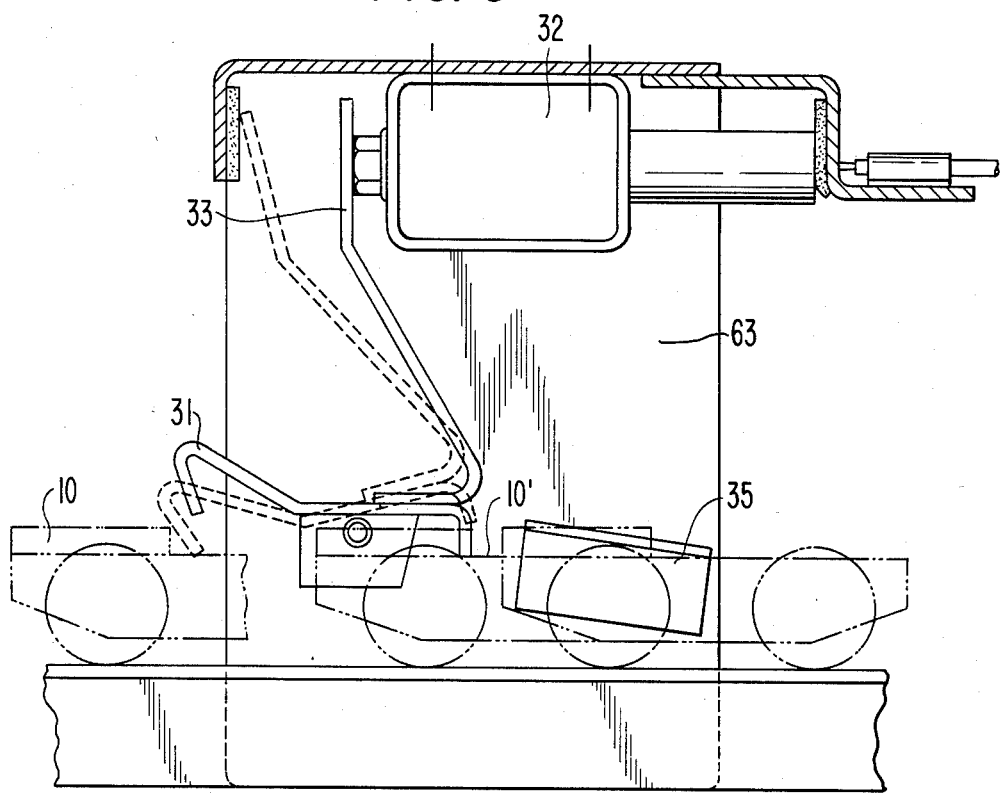
FIG. 9 is a front elevation of the One-by-One Dispenser, showing the way it works.

The O.O.D. 63 lets one cart pass, keeping those placed behind it in place. As shown in FIGS. 8 and 9, an arm 31 detains the cart 10. When an electromagnet 32 activates the lever 33 which is an integral part of the arm 31, the arm rotates, letting the cart pass 10, but retaining the carts behind it, as shown at 10' in FIG. 9.

When the electromagnet 32 is deenergized, a spring 34 returns the arm 31 to its original position, and the next cart 10' will then occupy the position of the previous one, the process being repeated. Some angle irons 35 keep the cart from rocking from side to side and prevent the unwanted opening of the O.O.D. 63. The same operation takes place when manual activation is preferred, or some other activation is desired, such as pneumatic or the like, where the cable or the respective activator will assume the action of the electromagnet 32.

In the case that there are various tracks, a selector 59, within the reach of the operator who is in the work post, determines which one of the different electromagnets 32 is energized, and, thus, determines which track will feed the work post in question.

Figure 12:
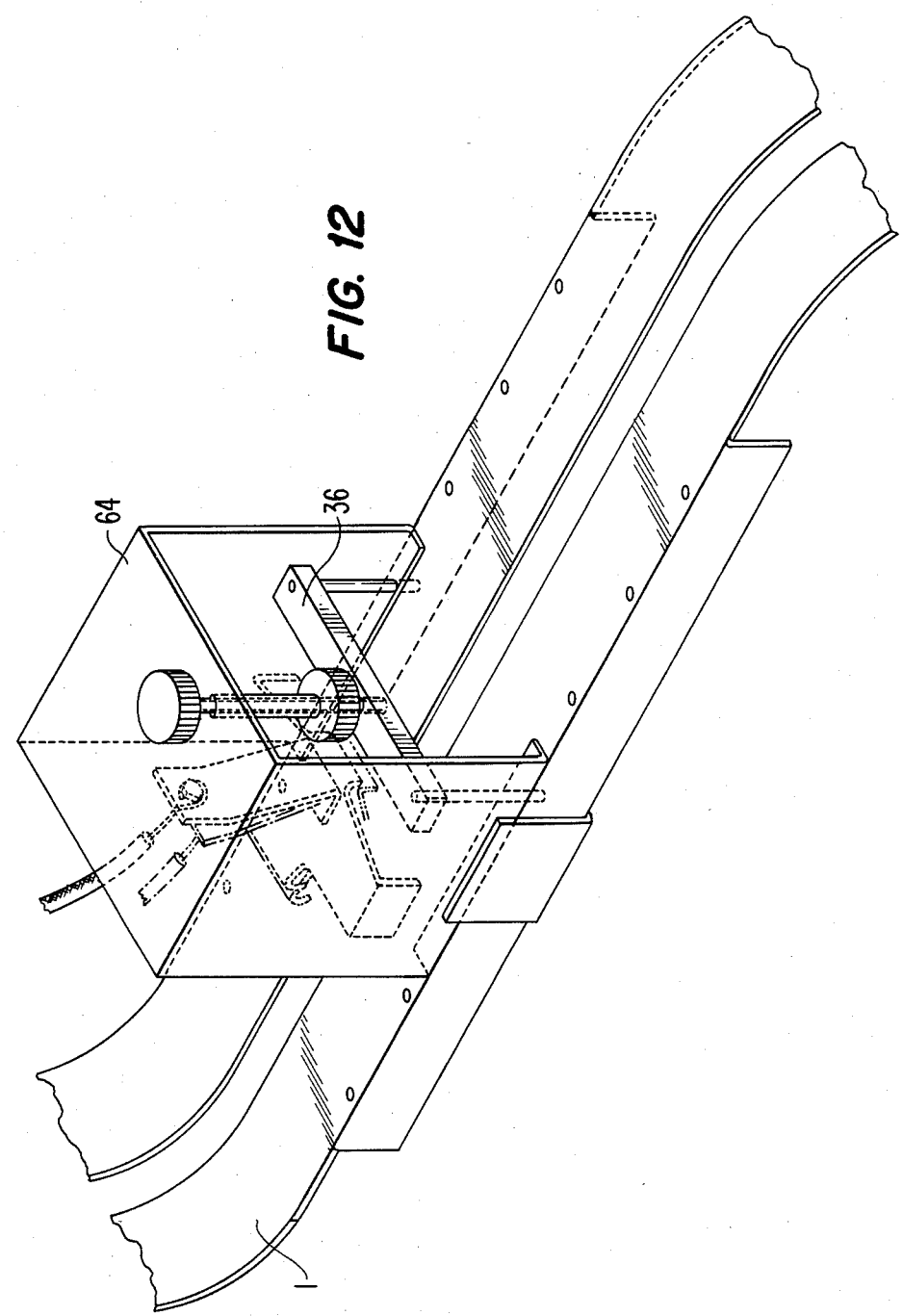
FIG. 12 is a perspective view of a mobile One-by-One Dispenser.

In addition, a mobile O.O.D. 64 (see FIG. 12) is provided which is based on the same principle as the O.O.D. 63, but which has a device 36 for its fastening in different points in the work area, for the purpose of regulating the height at the convenience of the operator.

Device 36 can be raised or lowered by means of the upper knurled nut. In the raised position it allows the O.O.D. to move up and down on the track, thus varying its height. In the lowered position, it fits into the illustrated holes in the track, thereby holding the O.O.D. in place.

Figure 10:
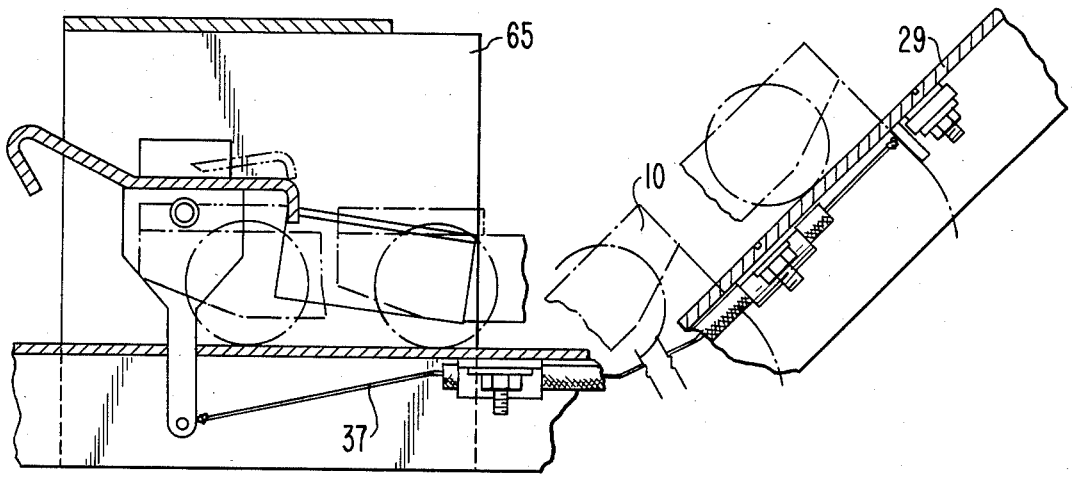
FIG. 10 is a schematic view of a One-by-One Dispenser for waiting area, showing the way it works.
Figure 11:
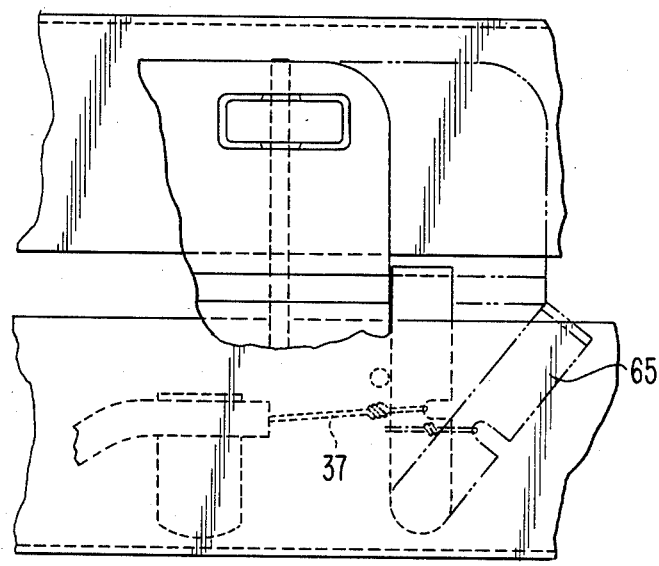
FIG. 11 is a schematic plan view of the mechanism operating the O.O.D. for waiting area, showing the way it works.

In addition, an O.O.D. for waiting area 65 (see FIGS. 10 and 11) is provided which has the same construction as the above-described devices, but without the electromagnet 32, and which is activated by means of a cable 37 with a casing which moves a mechanism in such a way that a cart 10 is automatically transferred to the ascent area 29 each time the preceding cart is lifted by the ascent system.

(d) Track switches

The track switches 38 constitute the means for the entry of the carts 10 in a station or in a given track of the station. These track switches 38 are activated by the central system when a cart must enter a given track. This operation is carried out with the assistance of an electromagnet 39. In a deactivated position, the track switch 38 allows for the continuity of the passage along the constituting track of the main circuit. However, in the activated position of this electromagnet 39, the keel of the cart which is travelling along the track is guided toward the track of the station in question. The special design of these elements allows for changes in direction which are performed as smoothly as possible.

(e) Lifting system

This system serves to empty the station automatically, by returning the carts stored therein to the main circuit. In the lifting system, the following elements are provided: An activator-inhibitor 40, a microswitch 41 installed in the waiting O.O.D. 65, an elevation tube 43 and a transport tube 44 with some attached elements, all of which are illustrated in FIG. 14.

Figure 16:
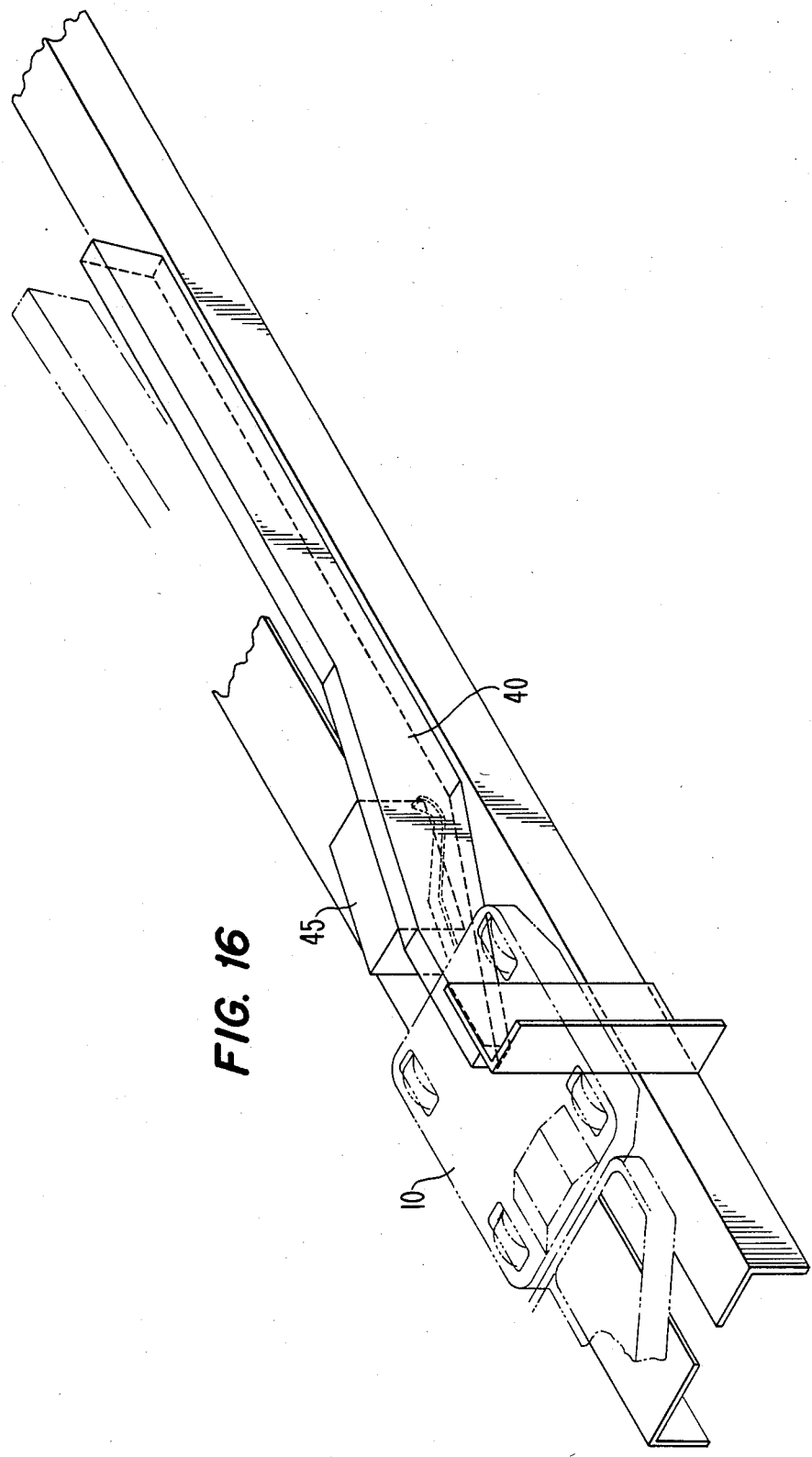
FIG. 16 is an schematic view of the activator-inhibitor device of the lifting system.

The activator-inhibitor 40 has a microswitch 45 which detects the passing of the pushers 12 if they are free, while it rises and inhibits them when a pusher 12 is transporting a cart 10. This operation can be seen in detail in the diagram of FIG. 16.

The activator-inhibitor 40 is located at an appropriate distance from the ascent track so that the cart is placed exactly ahead of the pusher which has been detected.

The microswitch 41 detects the presence or absence of a cart in the waiting position. It is connected in series with the microswitch 45 of the activator-inhibitor 40, and it acts to keep the lifting mechanism from operating if a cart is not in the waiting position; thereby avoiding the interruption of the automatic operation of the system.

The elevation tube 43 is located over the ascent track and acts to guide the lifter 46. The lifter 46 has the appropriate form for hooking up to the cart situated in the ascent area 21 and to deposit it on the track 47 of the main circuit.

A hook 48 which is housed in the rear groove of the cart will allow it to compensate for the geometric difference existing between the necessarily sloped tube and the track which is initially sloped downward; this situation is shown in FIG. 13. The lifter 46 drops under its own weight once the cart has been lifted, and it turns forward to pass around the cart placed in the ascent area.

Figure 17:
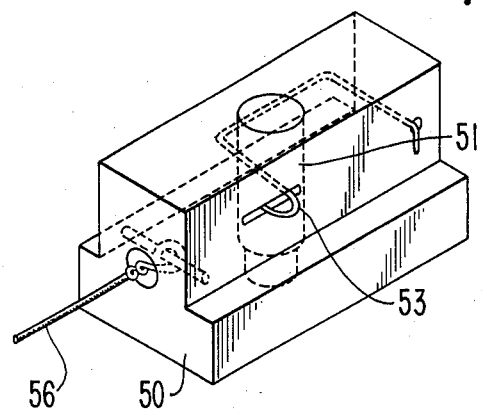
FIG. 17 is a perspective view of a puller of the lifting system.
Figure 18:
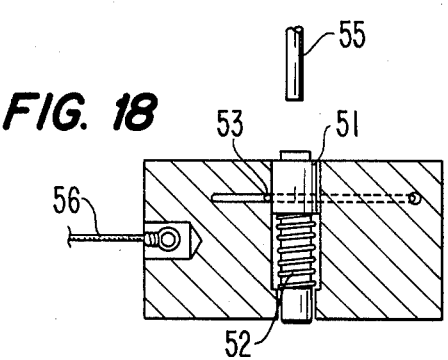
FIGS. 18 and 19 are cross-sectional views of the element shown in FIG. 17, showing the way it is activated.
Figure 19:
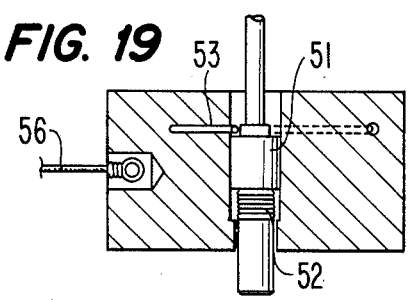

The transport tube 44, located over the track 49 of the main circuit, houses the puller 50. This has a pin 51 which is held in a raised position by means of a spring 52 (see FIGS. 17, 18 and 19). When being pressed on its upper side, this pin is blocked by the action of a metal strip 53 which may be separated by pressing on its free part, allowing this pin 51 to return to its original position.

Figure 20:
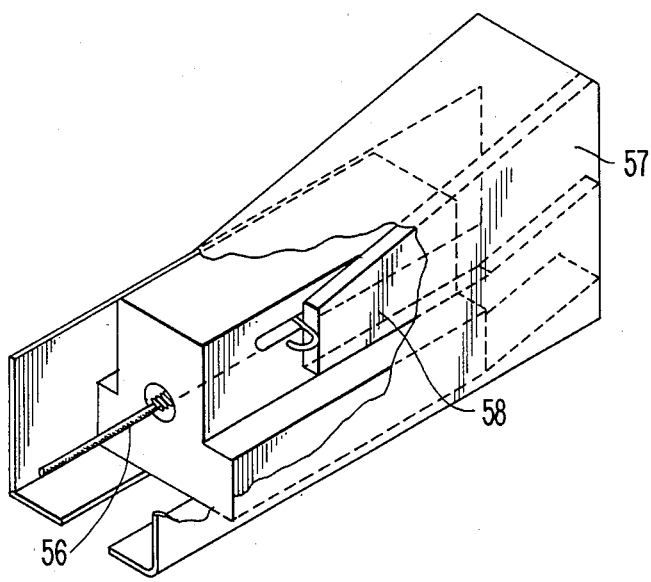
FIG. 20 is a perspective view of the foremost area of the transport tube, showing the way the puller is deactivated.

At the rear part of the tube 43 there is a microswitch 54 in series with the previously described microswitches and in series also with an electromagnet 55. The microswtich 54 detects the presence of the puller 50 in its correct position, and, in the opposite case, it inhibits the signal of the activator 40. When the pusher arrives at the electromagnet 55, it energizes the latter which moves the pin 51 downwards, leaving it blocked; this situation is shown in FIG. 20. When the next pusher 12 arrives, it will transport it with its projection, transmitting the movement by means of the cable 56 connected to the lifter by flexible casing.

On the foremost part of the transport tube 57, there is a plate 58 which, by acting on the steel band of the puller 53, frees its pin and thereby disconnecting the lifting system from the pusher once the cart has been returned to the track of the main circuit.

The group returns to the original position under the weight of the lifter. As a safety measure, the tube is open in an upward direction (see FIG. 14) on its foremost part to assure that, in all cases, the puller becomes free of the pusher, thus preventing the jamming or breaking of the main circuit.

As a safety measure, the ascent track has a cam 60 which prevents the backing-up of a cart due to a possible rocking from side to side toward the ascent track.

(f) Readers

The readers are the elements in charge of supplying the information concerning the evolution of the carts to the central system.

There is one reader for each station, which is located before the station on the main circuit. Among the possible types (magnetic, mechanical, optical by reflection, optical by transmission), the optical reader by transmission is preferred.

The reader consists of one transmitter and two receivers, which read the strobe signal and the data signal. These signals are punched on a card which is opaque to the light of the transmitter. For the sake of simplification, the holes for the passage of the light signal are vertically aligned, and the strobe gives the reading signal through the rear flank of the perforation, for which purpose the strobe receiver has advanced so that its signal coincides in time with the center of the data.

The receivers, in conjunction with their associated amplifier, are mounted on a printed circuit card located on the lower part of the track of the main circuit. On the other hand, the transmitter which is fed by the receiver plate is located on the other track.

The readers are located on the main circuit, separated by a distance multiple of the distance existing between pushers 12, in such a way that they read the information and store it on the card simultaneously.

The central system is notified of the fact that the reading has been made and that it can proceed to the emptying of the registers by means of a detector for detecting the passage of the pusher and being constituted by one transmitter and one receiver which are appropriately situated to detect the passage of the pusher 12 which will indicate that the readers have finished their reading.

In this way, the central system will known the situation of the carts on the main circuit at intervals of one passage of the pushers, which enables it to carry out its control function.

(g) Control cards

Regarding these control cards, it is necessary to distinguish between those which carry out the control of the modules and those destined for the control of the motor.

Figure 23A:
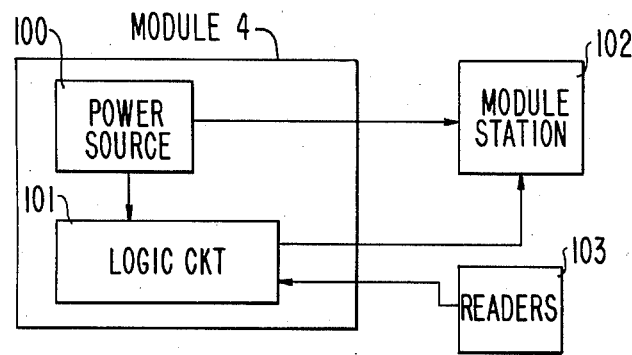
FIG. 23a is a block diagram of a module chassis.

The control cards of the modules are those designated by numeral 4, and they are located on the columns 2. The control cards comprise the blocks shown in FIG. 23 which are as follows:

67: Reading and storage means for the reading and storage of information
68: Error detection block
66: Status block
69: Activation means for activating the electromagnets.

The information supplied by the readers 5 is passed to the card by the lines 70 and 71 (data and strobe of one station) and lines 72 and 73 (data and strobe of another station). The information may pass to registers whenever a microcomputer is not carrying out a reading operation, to be stored in these registers.

The microcomputer is notified by the reader of the passage of the pusher and of the fact that the storage has been completed, and it reads the cards successively, defining the module direction by line 74, the reading order by line 75 and sending a series of pulses by line 76 to empty the registers.

Detection of reading errors is carried out by binary counters and two latches, the purpose of which is to count the number of strobes in one station and the other, cutting off the input of the information when the strobe count surpasses seventeen and giving an error code (output of "1") when the strobe count surpasses twenty-four.

The incidents in the stations which must be dealt with by the microcomputer, such as the lack of work, inactive station, etc., are stored in eight bits of a register and are read in the same way as the information of the readers.

The activation of the electromagnets is carried out by the microcomputer through the block 69, by entering the direction of the electromagnet through lines 77, the information for opening or closing through line 78 and the order of effecting the operation through line 79.

The control of the motor is housed on the same column which supports the motor. It consists of a motor control contact, control relays, one thermal relay, one movement sensor, a control logic and appropriate feed for all these elements.

The movement sensor is of a magnetic type and detects the pulses produced by the studs on the disks 8 which transport the band 9, disconnecting the motor when the frequency of the pulses is less than nominal.

The control logic allows the functioning of the band 9 when the micorcomputer so commands it and the movement sensor does not detect any abnormality, detaining it should the contrary occur. This mechanism can be inhibited with a switch which thus allows the manual movement of the chain.

In the aerial transport, a module is defined as a set of two facing stations.

There are two types of control chassis on the transport:
  motor control chassis; there is one of these transport.
  module chassis; there is one of these per module.

The module chassis are those designated by the number 4 and they are located in the columns indicated by the number 2. The module chassis shown in FIG. 23a supplies power to the electromagnets of the module stations 102, stores the reading from the readers of the nearest stations, 103, and opens/closes the electromagnets at the entrance to these module stations, 102.
  Located within the module chassis are:
  Logic circuit board, 101.
  Power source, 100.

Logic circuit board 100 stores and transmits to the microcomputer the information supplied by the readers and also activates and deactivates the electromagnets in accordance with the instructions from the microcomputer.

Figure 23B:
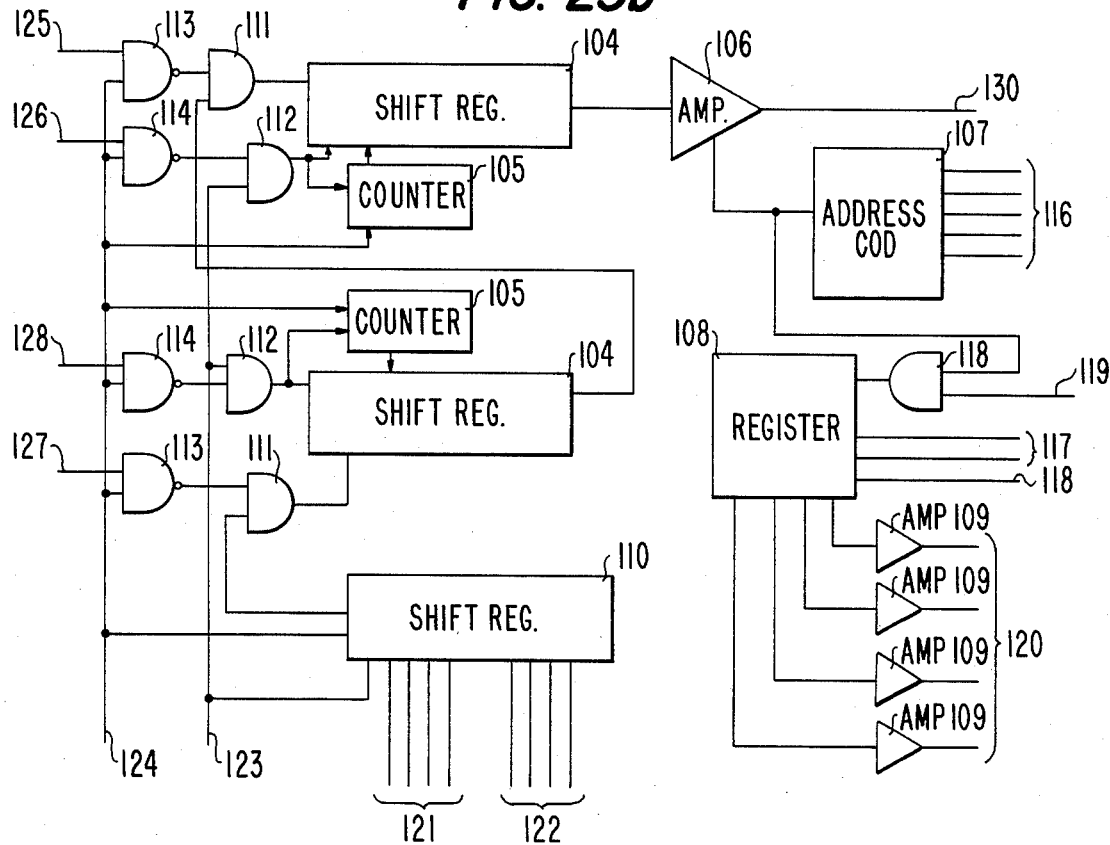

We now go on to describe the logic circuit board. FIG. 23b shows the block diagram for this circuit board.

The information supplied by the readers travels along data lines 125 and strobe lines 126 for one station and along data lines 127 and strobe lines 128 for the other station in the module. When the microcomputer is not reading the information stored in the circuit board, it puts line 124 into the correct mode to allow the data and strobe to pass through gates 113 and 114 to the shift register, 104. The strobe acts as a clock for these registers. For each strobe signal, the data currently at the input to register 104 is written is this register and all the information present in this register, 104, is shifted one position to leave room for the next piece of information. Once a cart has completely passed through a reader, the information for that cart is stored until the microcomputer decides to read it.

The shift registers, 104, may be loaded in parallel with a preselected value.

To detect any errors in the number of strobes, there are separate counters, 105, which are loaded with a preselected value. Each strobe decrements the counter 105 by one. If the number of strobes is greater than the preselected value, counter 105 generates a pulse which loads the register, 104, with the preselected value corresponding to the error code.

The block designated by the number 110 is a shift register of the same type as 104. This register is used to store the state of each station (lack of work, station inactive, etc.). The state of each station is set by means of an operator-accessible rotary switch and this information travels along lines 121 for one station and lines 122 for the other station.

Block 107 is an address codifier which activate amplifier 106 to transmit the information to the microcomputer and it also activates register 108 to allow the latter to store the state of the electromagnets of both of the module stations.

Codifier 107 is always activated as long as the address set on lines 116 matches the module address.

Amplifiers 109 supply the power necessary to activates the electromagnets.

When the microcomputer decides to read the information stored in the circuit boards, 101, it carries out the following sequence:

1. It activates signal line 124 at a level sufficient to block the passage of the pulses from the readers, 103, to the shift register. It places shift register 104 and 110 in series and passes the state of station selected by means of the rotary switch to the shift register 110.

2. It sets the module address on lines 116, whereupon amplifier 106 allows information to travel to the microcomputer along line 130.

3. It supplies a series of pulses along line 123. These pulses travel through the ports, 112, to the shift register, acting as a clock for these registers. In this way, the stored information will flow towards the microcomputer through the amplifier, 106.

4. Steps 2 and 3 are repeated for each module in the aerial transport.

5. When the last module has been read, signal 124 is deactivated, thus permitting the passage of pulses from the readers, 103, to the shift register, 104.

To activate/deactivate the electromagnets associated with a module, the microcomputer carries out the following operation:

1. It sets the module address on lines 116.
2. It sets address of the electromagnet to be actuated on lines 117.
3. It sets the information (activate/deactivate) on line 118.
4. It uses line 119 to give the order to write in file 108.

The power source, 100, supplies power to the electromagnets and the amplifiers, 109, act as electronic switches for this power.

The motor control chassis is located in the same column that supports the motor. Through the activation of the contactors, this chassis controls the supply of power to the transport drive motor.

Once the motor has been started up, it may be stopped in one of the following ways:

By pressing the STOP button located on the side of the-microcomputer.

The microcomputer can stop the motor by means of a connecting line between the motor control chassis and the-microcomputer.

By pressing any of the safety and emergency system buttons located throughout the transports.

When the frequency of the pulses generated by the movement sensor falls below 6 Hz.

The movement sensor is of the magnetic type and detects the pulses produced by the lugs of the discs, 8, which move the belt, 9.

(h) Central system

The central system consists of a microcomputer with screen, keyboard, printer and disks which is connected to the control cards.

The system directs the evolution of the carts in accordance with the route which is assigned to them, being able to make decisions regarding the load balance in the stations according to predetermined criteria and giving notice of overloads in every case.

Since the system knows all of the information concerning the evolution of the carts and the status of the stations, it is capable of managing the production and personnel at whatever level may be desired to be programmed, thus supplying any type of information regarding total production, production by work post, by model made up, operational time, etc.

It is possible to act upon the central system at any time by means of the keyboard in order to obtain partial or overall information, modify routes, assign new stations, etc.

FIG. 23c shows a block diagram of the central system 140.

The central system consists of a microcomputer, 141, with a screen, 145, a keyboard, 146, a printer, 147, and discs, 150.

The microcomputer, 141, is connected to the other organs of the transport system (control circuit boards, motor controls, etc.) through an interface circuit board, 144.

The microcomputer is made up of two processors, a main processor, 142, and slave processor, 143, each with its own memory for the storage of programs and data.

Processor 143, performs the physical control of the transport. This processor, 143, receives information on the transit of the pushers through a pushbutton, 148, which is actuated by the pushers. The position of this pushbutton, 148, is such that when it is actuated by a pusher it insures that all the readers have read all the carts present of the main circuit.

When it receives a pusher transit signal through pushbutton, 148, it reads the information stored in the modules, 4. The way in which these modules are read is set out under section (g). In this way, processor 143 obtains the position of the hangers in the main transport circuit in real time.

The main processor carries out the following tasks:

(a) It manages the screen and keyboard for communication with the operator.
(b) It manages the printer, through which it supplies such reports as total production, production by work position, style, etc.
(c) It manages the discs. The situation of the transport is periodically stored on the discs to enable the system, after a given work day, to pick up the same point on the following day by reading the information contained on the disc with regard to the state of the transport on the preceding day.
(d) It directs the progress of the carts in accordance with the routes assigned to the latter, ensuring a balance of the load between stations performing the same operations.

Each time the slave processor, 143, detects a transition of the line (due to the entry or exit of a cart from the main circuit), it communicates this transition to the main processor, 142. If the transition is due to the exit of a cart, the main processor, 142, looks to see which is the next station to which this cart should go on the route assigned to it, passing this information on to the slave processor, 143, which then inserts the cart into the station assigned by the master processor.

The slave processor, 143, knows the distance between the reader and the entrance to the next station, according to the direction of movement. In this way, when a cart passes through the reader immediately before the station it should enter, the slave processor, 143, knows at what moment it should give the electromagnet actuation order to the appropriate module, in the way set out in section (g) above, to ensure the cart enters this station.

Since the main processor, 142, processes information on all the transitions that take place in the transport system, it is aware of the position of all the carts in this system, regardless of whether they are on the main circuit or in the stations. With this information, it is able to generate the reports on total production, production by work position, productivity by work position, location of hangers, etc.

Through the keyboard and screen, the central system can be actuated at any time to obtain any report, modify routes, assign new stations, etc.

Evidently, the details of the construction explained above may be varied or modified without departing from the fundamental principles of the invention.

I claim:

1. A transport system comprising:
a main circuit having a plurality of stations; a plurality of support elements which are rollable along said main circuit, wherein one of either hangers, trays and hooks or other elements for holding garments, parts, components or other elements are hung on said support element, and wherein each of said support elements carries a code thereon which identifies the support element as well as the element supported thereof;

a plurality of readers for identifying said support elements on their passage thereby and, for thus supplying information regarding the location and movement of said support elements;

wherein each of said support elements has a body with wheels, the back part being arranged so as to be retained and dispensed by a one-to-one dispenser and to be raised by a lifting system; and a keel for guiding said support element along the tracks and for carrying an identification code and for allowing a load to be hung by means of a hook;

wherein said identification code is optically read through the transmission of a code punched on a card by a row of strobed punches, each of said readers comprising a transmitter and two receivers, said code being digitally recorded;

and wherein said support elements are transported along said main circuit by pushers and wherein said plurality of readers are spaced apart by a distance corresponding to a multiple of the distance separating said pushers;

said system further comprising a pusher detector operatively connected to a microprocessor which is operatively connected to said readers, said pusher detector outputting a signal to said microprocessor to enable said microprocessor to read registers, thereby enabling said microprocessor to monitor the movement of said support elements.

2. A transport system in accordance with claim 1, further comprising a means for supplying reports, operatively connected to said microprocessor, said reports providing information as to the operation of the elements of said transport system.

3. A transport system comprising:

a main circuit having a plurality of stations; a plurality of support elements which are rollable along said main circuit, wherein one of either hangers, trays and hooks or other elements for holding garments, parts, components or other elements are hung on said support element, and wherein each of said support elements carries a code thereon which identifies the support element as well as the element supported thereof;

a plurality of readers for identifying said support elements on their passage thereby and, for thus supplying information regarding the location and movement of said support elements;

wherein said support elements are supported by tracks, and slide into said stations by the force of gravity, and are raised to aid main circuit by a lifting system and are transported along it by pushers which form an integral part of a band which is moved by at least one motor;

wherein said identification code is optically read through the transmission of a code punched on a card by a row of strobed punches, each of said readers comprising a transmitter and two receivers, said code being digitally recorded;

and wherein said support elements are transported along said main circuit by pushers and wherein said plurality of readers are spaced apart by a distance corresponding to a multiple of the distance separating said pushers;

said system further comprising a pusher detector operatively connected to a microprocessor which is operatively connected to said readers, said pusher detector outputting a signal to said microprocessor to enable said microprocessor to read registers, thereby enabling said microprocessor to monitor the movement of said support elements.

4. A transport system according to claim 3, wherein said main circuit is formed by self-supporting tracks, a section of which is designed to allow for he support, rolling and guidance of said support elements and the guidance of said band.

5. A transport system according to claim 3, wherein the combination of said band and said pushers is designed so as to be manufactured of injected plastic in such a way that said band is provided with reinforced drill holes upon which said at least one motor acts for transporting said band and aid band is formed by a plurality of sections, and the connections between aid sections and said pushers have small wheels for decreasing friction said combination arranged so as to allow it to adapt to curves and to transport said lifting system.

6. A transport system according to claim 3, wherein said lifting system comprises an elevation tube placed on a lifting track which is guided by a lifter which hooks up to a support element and pushes it during lifting and deposits it on the track of said main circuit and frees it on the descent thereof and further comprises a transport tube placed on the track of said main circuit which houses a puller, the axle of which while, on being pressed on its upper part, is blocked by a metal strip in order to permit its transport by a pusher and which, in turn, transports said lifter by means of a flexible cable guided by a flexible cover.

7. A transport system in accordance with claim 3, wherein said lifting system comprises:

an activator-inhibitor placed on said main circuit at a distance so that a support element is positioned in a space before a desired pusher, and which is equipped with a microswitch that detects the passing of pushers only if they are free;

a microswitch for detecting waiting which is positioned in a waiting area;

a microswitch that detects the return of a puller to its correct position;

an electromagnetic which causes a member to strike the axle of said puller;

a plate placed on a front part of a transport tube which acts upon a metal strip of said puller, freeing the axle so that said lifting system returns to its initial position;

said transport tube arranged so that said puller never becomes caught; and a safety lever which impedes the backward movement of a support element on a lifting track.

* * * * *